(12) United States Patent
Hosoya

(10) Patent No.: US 6,376,956 B1
(45) Date of Patent: Apr. 23, 2002

(54) PERMANENT MAGNET POLE ARRANGEMENT OF MOTOR

(75) Inventor: Akifumi Hosoya, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/521,604

(22) Filed: Mar. 9, 2000

(30) Foreign Application Priority Data

Mar. 12, 1999 (JP) .......................................... 11-065925

(51) Int. Cl.⁷ .................... H02K 21/26; H02K 21/12; H02K 1/12; H02K 1/22
(52) U.S. Cl. .............. 310/154.17; 310/154.26; 310/154.43; 310/156.19; 310/254; 310/261
(58) Field of Search .................. 310/91, 218, 261, 310/154, 263, 254, 216, 179, 152, 154.04, 154.05, 154.06, 154.08, 154.13, 154.16, 154.17, 154.18, 154.19, 154.03, 154.26, 154.27, 154.43, 154.01, 156.19, 156.28

(56) References Cited

U.S. PATENT DOCUMENTS

| | | | | |
|---|---|---|---|---|
| 3,790,830 A | * | 2/1974 | Bonfiglio | 310/42 |
| 4,580,072 A | * | 4/1986 | Morishita | 310/154 |
| 4,859,892 A | * | 8/1989 | Shiroyama | 310/218 |
| 5,481,148 A | * | 1/1996 | Moribayashi et al. | 310/154 |
| 5,675,204 A | * | 10/1997 | Kusumoto et al. | 310/154 |
| 5,723,929 A | | 3/1998 | Niimi | 310/154 |
| 5,811,908 A | * | 9/1998 | Iwata et al. | 310/261 |
| 6,150,746 A | * | 11/2000 | Lechner | 310/181 |

FOREIGN PATENT DOCUMENTS

| | | |
|---|---|---|
| DE | 197 05 432 A1 | 8/1998 |
| FR | 2617343 | * 12/1988 |
| JP | 61-73563 | 4/1986 |
| JP | 405276694 A | * 10/1993 |
| JP | 9-168245 | 6/1997 |

* cited by examiner

*Primary Examiner*—Nestor Ramirez
*Assistant Examiner*—Guillermo Perez
(74) *Attorney, Agent, or Firm*—Oliff & Berridge, PLC

(57) ABSTRACT

A pole arrangement of a motor includes a plurality of permanent-magnet main poles disposed annularly at equal intervals on the inner periphery of a yoke, a plurality of auxiliary poles disposed between adjacent two of the main poles, and a plurality of magnet holders disposed between adjacent two of the main poles. Each the magnet holder is comprised of at least one resilient stopper member for pressing the main poles in the circumferential direction, and each the auxiliary pole is held between the pair of resilient stoppers.

10 Claims, 5 Drawing Sheets

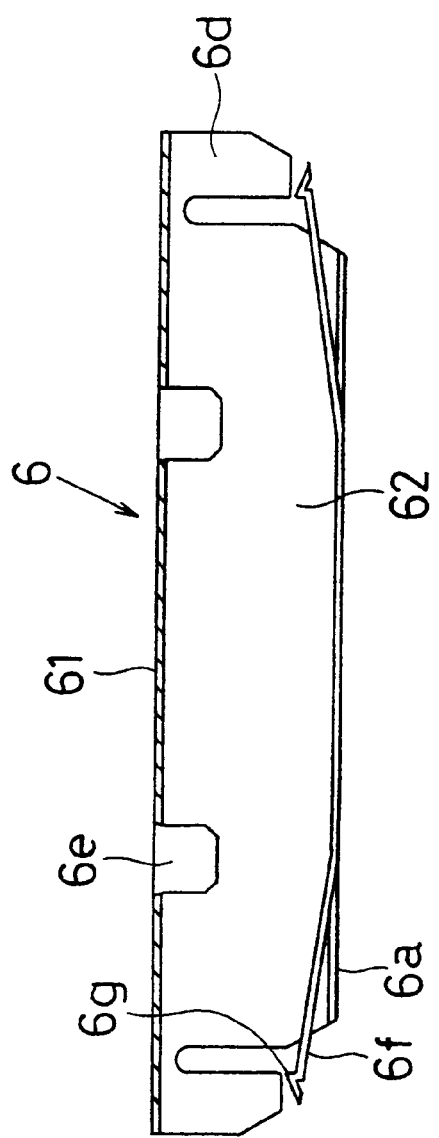
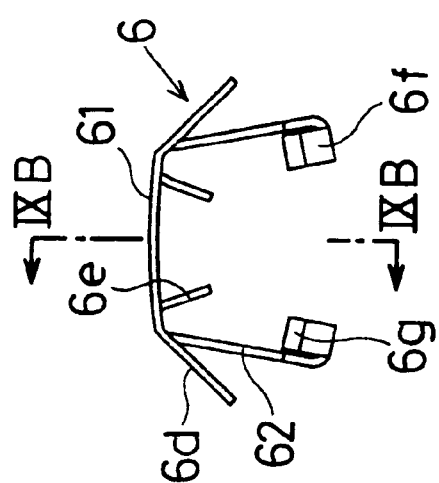

PERMANENT MAGNET POLE ARRANGEMENT OF MOTOR

CROSS REFERENCE TO RELATED APPLICATION

The present application is based on and claims priority from Japanese Patent Application Hei 11-65925 filed on Mar. 12, 1999, the contents of which are incorporated herein by reference.

BACKGROUND OF THE INVENTION

1. Field of the Invention

The present invention relates to a motor having a plurality of permanent-magnet main poles and a plurality of auxiliary poles which are alternately fixed to an inner periphery of a motor yoke.

2. Description of the Related Art

A DC motor disclosed in U.S. Pat. No. 5,723, 929 or its corresponding Japanese application JP-A 9-84315 has a plurality of annularly aligned permanent-magnet main poles and a plurality of auxiliary poles disposed between adjacent two of the main poles. The auxiliary poles are supported by a cylindrical sleeve which is fitted to the inner periphery of the main poles.

The sleeve increases the distance or air gap between an armature and the main poles and reduces the output power of the motor. Usually, such a sleeve is bulged by press-forming against the main and auxiliary poles to make the inside diameter thereof uniform. This may damage permanent-magnets of the main poles and the auxiliary poles.

SUMMARY OF THE INVENTION

The present invention has been made in view of the above-stated circumstances.

Therefore, a main object of the invention is to provide a pole arrangement which makes the air gap as small as possible.

Another object of the invention is to provide a pole arrangement in which permanent magnets are immune to damage caused by outside pressure.

According to a main feature of the invention, a pole arrangement of a motor includes a plurality of permanent-magnet main poles disposed circumferentially at equal intervals on the inner periphery of a yoke, a plurality of magnet holders with auxiliary poles therein disposed between the adjacent main poles.

Each magnet holder preferably includes resilient stopper means pressing the main poles in the circumferential direction, and each auxiliary pole is disposed inside the resilient stopper means.

Therefore, the auxiliary poles can be supported by the magnet holders, and additional sleeve is not necessary. As a result, the air gap can be made as small as possible.

Because the pair of resilient stoppers resiliently presses the main poles, each of the magnet holders can be held between two of the main poles by the counteraction thereof. This eliminates additional fixing means such as welding or rivetting.

Each main pole can be held only by the resilient stopper means from circumferentially outside. Therefore, it is not necessary to fix the magnet holders to the inner periphery of the yoke by an adhesive or the like, and the main poles can be assembled easily at a low cost.

According to another feature of the invention, each magnet holder may further include a first stopper member supporting axially opposite ends of the auxiliary pole, a second stopper member supporting axially opposite ends of the main poles, and a third stopper member supporting an outer periphery of the auxiliary poles. Thus, the magnet holder can be formed into a simple U-pipe.

More preferably, the yoke has a pair of projections on an inner periphery thereof, and each magnet holder has a pair of cavities at axially opposite ends which are engaged by the projections so that the magnet holders can be fixed to the yoke in both axial and circumferential directions.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 9A is a axially front view of a magnet holder of a pole arrangement according to a fifth embodiment of the invention; and FIG. 9B is a cross-sectional view of FIG. 9A cut along line 9B—9B.

DETAILED DESCRIPTION OF THE PREFERRED EMBODIMENTS (First Embodiment)

A motor having a pole arrangement according to a first embodiment of the invention is described with reference to FIGS. 1–4.

Figure 1:
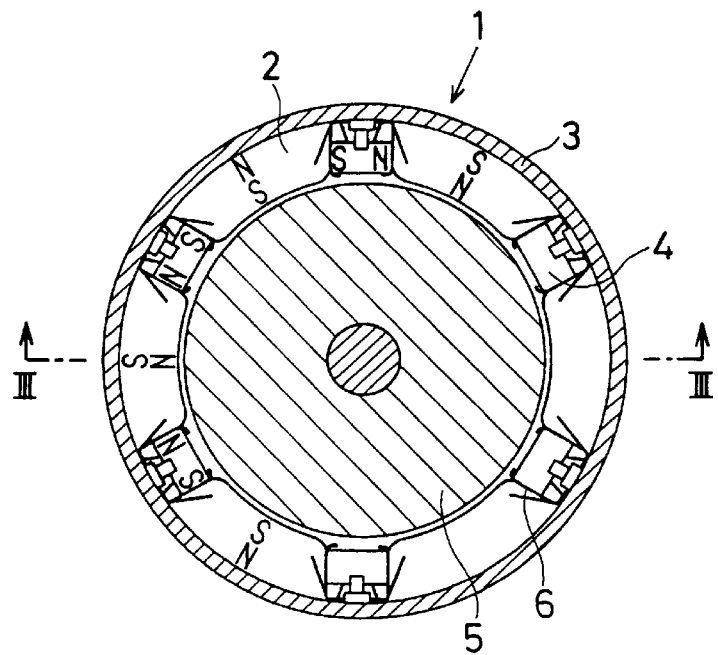
FIG. 1 is a cross-sectional view of a DC motor equipped with a pole arrangement according to a first embodiment of the invention.

In FIG. 1, DC motor 1 has a pole arrangement including a plurality of permanent-magnet main poles 2, a yoke 3, a plurality of auxiliary poles 4 and armature 5 rotatably held within main poles 2 and auxiliary poles 4.

Main poles 2 are circumferentially aligned and fixed to the inner periphery of yoke 3 at equal intervals. The permanent magnets of main poles 2 are magnetized to form S-pole and N-pole in the radial direction so that one of main poles 2 is different in magnetic pole from the adjacent poles, as shown in FIG. 1.

Figure 4:
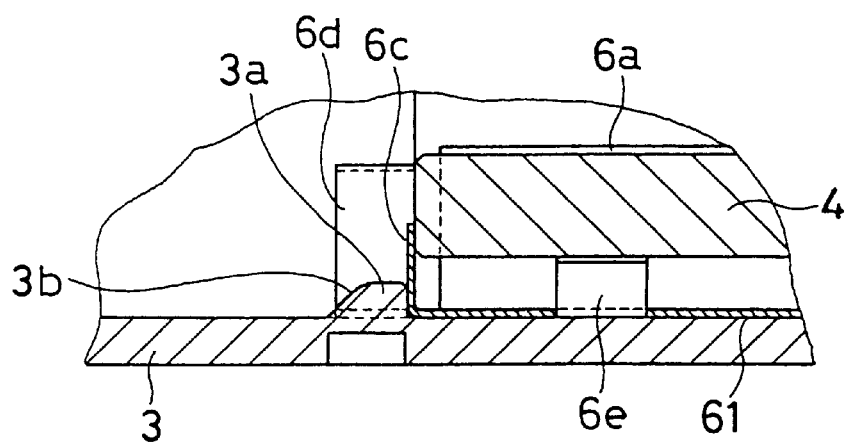
FIG. 4 is a cross-sectional view cut along line IV—IV in FIG. 3.

Yoke 3 is a cylindrical iron member having projections 3a on the inner periphery thereof, as shown in FIG. 4. Projections 3a can be formed by punching or the like to have a gentle slope 3b which descends in the axial direction.

Each auxiliary pole 4 is disposed adjacent two of main poles 2. Auxiliary poles 4 are also comprised of permanent magnets. The auxiliary-pole permanent magnets are magnetized to alternately form S-pole and N-pole in the circumferential direction, so that the magnetic pole of the inner periphery thereof can be the same as the magnetic pole of the inner periphery of those of main poles 2 adjacent thereto.

Figure 2:
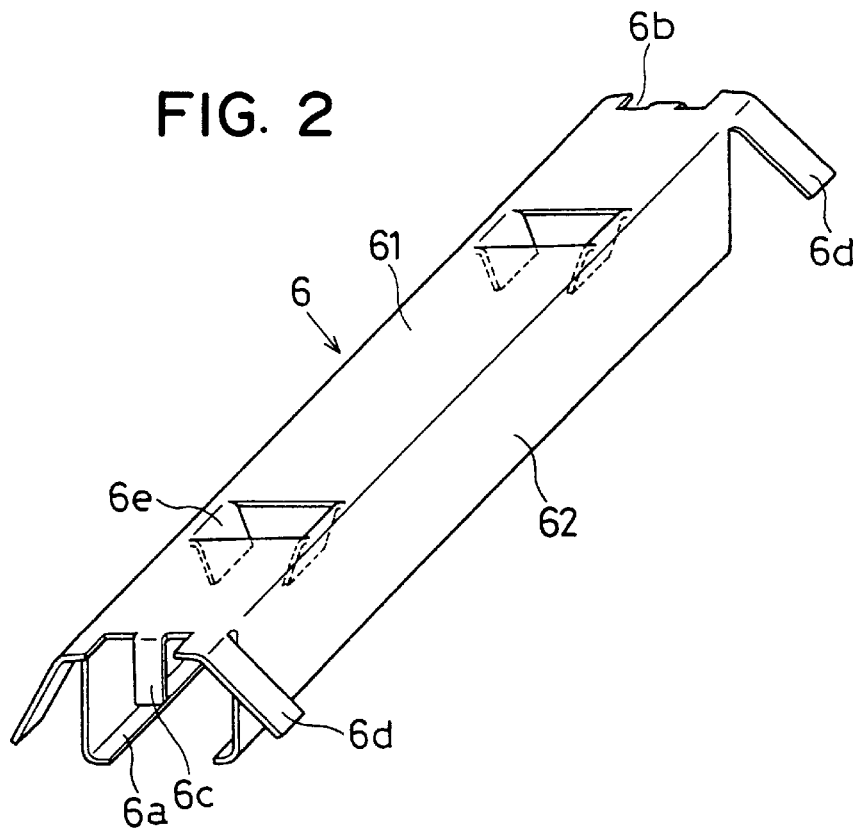
FIG. 2 is a perspective view of a magnet holder of the pole arrangement according to the first embodiment.

Main poles 2 and auxiliary poles 4 are respectively supported by magnet holders 6. As shown in FIG. 2, each magnet holder 6 is comprised of a stainless-plate-U-pipe portion having base plate 61 and side plates 62. Each magnet holder is disposed between adjacent main poles 2, and each auxiliary pole 4 is disposed inside the U-pipe portion.

The circumferential width of the base plate 61 of magnet holders 6 is approximately equal to the distance between adjacent two of main poles 2, and side plates 62 extends to be slightly open. Accordingly, two side plates 62 of magnet holders 6 resiliently press the circumferential sides of main poles 2, and magnet holders 6 are held between main poles 2 by counteraction.

Each magnet holder 6 has a pair of inwardly extending L-bends 6a at the edge of side plates 62, which hold auxiliary poles 4 at the inner surface thereof. Each magnet holder 6 also has rectangular cavities 6b formed at the axially opposite ends thereof and a pair of first stoppers 6c extending from cavities 6b, two pairs of second stoppers 6d extending from axially opposite ends of side plates 62, and two pairs of third stoppers 6e extending from a pair of cut-outs formed at base plate 61.

A method of fixing main poles 2 and auxiliary poles 4 by magnet holders 6 is described hereafter.

Firstly, auxiliary poles 4 are axially inserted into the U-pipe portion of magnet holders 6 so that the pair of L-bends 6a holds auxiliary poles 4. Consequently, the two pairs of third stoppers 6e resiliently press the radially outer periphery of auxiliary poles 4. Each first stopper 6c is bent radially inward at the axially opposite ends of magnet holder 6 to support auxiliary poles 4, as shown in FIG. 4. Thus, axial and radial shifts of auxiliary poles 4 are restricted.

Subsequently, each magnet holder 6 is inserted into the space between adjacent main poles 2 with base plate 61 being opposite to yoke 3. Since side plates 62 have been formed to slightly open, they are slightly compressed between adjacent main poles 2 after they are inserted. Thus, main poles 2 are held between magnet holders 6 under the spring force thereof. Because side plates 62 resiliently press the side walls of main poles 2, magnet holder 6 is held between main poles 2 by the counteraction thereof.

Figure 3:
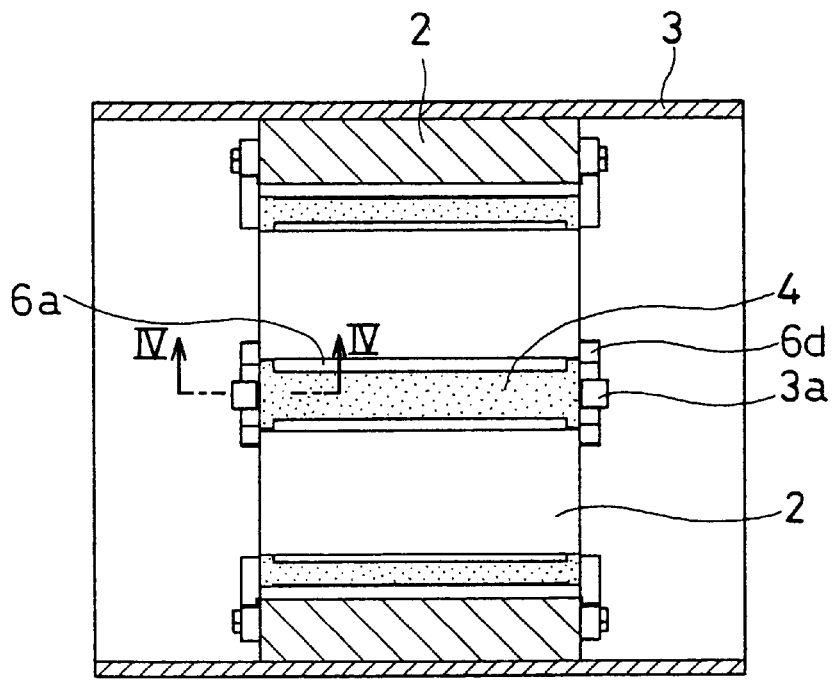
FIG. 3 is a cross-sectional view cut along line III—III in FIG. 1.

Projections 3a are fitted into cavities 6b at the axially opposite ends thereof so that the axial and circumferential positions thereof relative to yoke 3 are fixed as shown in FIG. 3. Since slope 3b descends in the axial direction, cavities 6b are not obstructed by projections 3a when magnet holders 6 are inserted between main poles 2. Then, second stoppers 6d expands to hold the axially opposite ends of main poles 2.

Thus, any sleeve or the like is not necessary to fix auxiliary poles 4. As a result, the air gap can be made as small as possible, resulting in increase in the output power. Moreover, the permanent magnets become immune from outside stresses.

(Second Embodiment)

Figure 5:
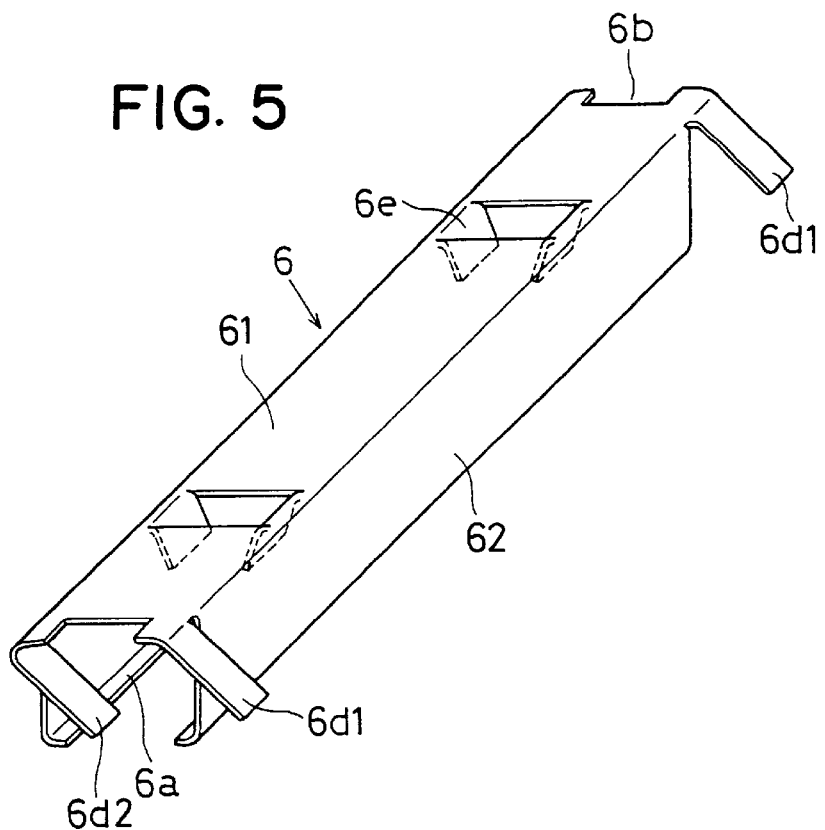
FIG. 5 is a perspective view of a magnet holder of a pole arrangement according a second embodiment of the invention.

A pole arrangement according to a second embodiment of the invention is described with reference to FIG. 5.

One pair of second stoppers 6d1 is bent outward to support main poles 2, while the other pair of second stoppers 6d2 is bent inward to support one of auxiliary poles 4. Thus, first stopper 6c of the magnet holder according to the first embodiment is omitted.

Each of second stoppers 6d1 and 6d2 has an axial length to provide stronger holding force as compared with first stoppers 6c of the first embodiment, because second stoppers 6d1 and 6d2 have a sufficient strength corresponding to the axial length thereof while first stoppers 6c are bent in the thickness direction (Third Embodiment)

Figure 6:
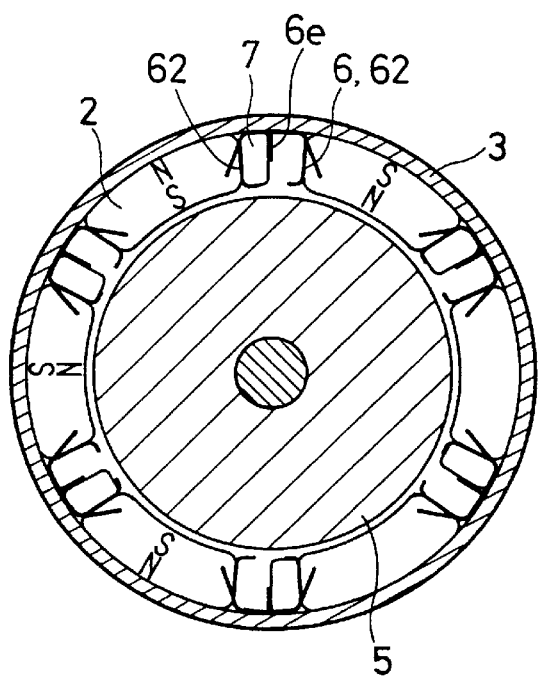
FIG. 6 is a cross-sectional view of a DC motor equipped with a pole arrangement according to a third embodiment of the invention.
Figure 7:
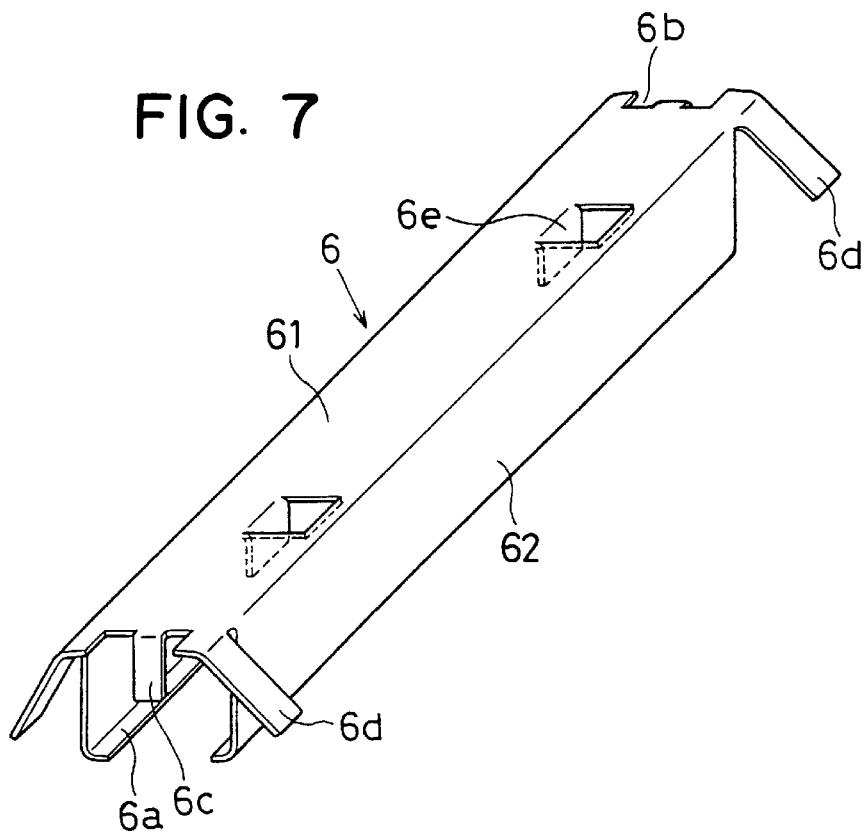
FIG. 7 is a perspective view of a magnet holder of the pole arrangement according to the third embodiment.

In a pole arrangement according to a third embodiment of the invention has iron pieces 7, as commutating poles, between main poles 2, as shown in FIGS. 6 and 7.

Each magnet holder 6 has a pair of cavities 6b at the axially opposite ends thereof, a pair of first stoppers 6c extending from cavities 6b, two pairs of second stoppers 6d extending outward from side plates 62, and a pair of third stoppers 6e extending from base plate 61 into the inside of the U-pipe portion of magnet holder 6.

Each iron piece 7 is inserted between third stoppers 6e and one of side plates 62 as shown in FIG. 6, so that it is supported by L-bend 6a at the radially inner periphery thereof, between third stoppers 6e and one of side plates 62, and by a pair of first stoppers 6c at axially opposite surfaces thereof. Thus, iron pieces 7 are fixed and held inside magnet holders 6.

Each magnet holder 6 is inserted between circumferentially adjoining two main poles 2 so that a pair of cavities 6b engages a pair of projections 3a of yoke 3 to fix magnet holders 6 to yoke 3 in the axial and circumferential directions.

Magnet holders 6 and main poles 2 are the same as the first embodiment.

Each magnet holder 6 resiliently presses the side surfaces of the adjacent main poles 2 via side plates 62 and is also held between adjacent main poles 2 in return.

(Fourth Embodiment)

Figure 8:
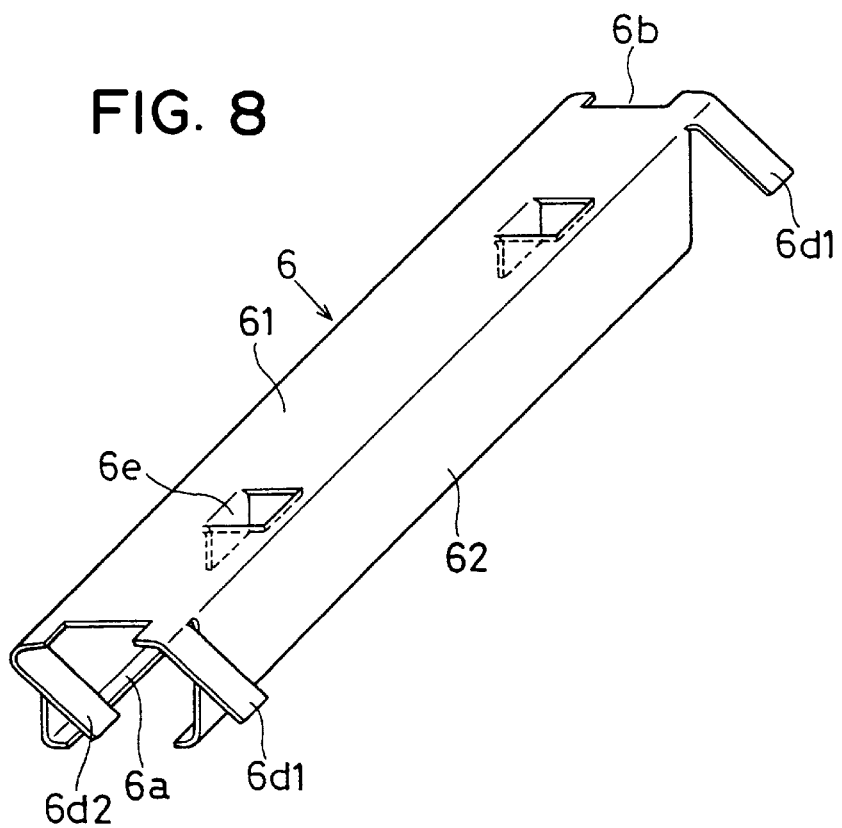
FIG. 8 is a perspective view of a magnet holder of a pole arrangement according to a fourth embodiment of the invention.

A pole arrangement according to a fourth embodiment of the invention is described with reference to FIG. 8.

One pair of second stoppers 6d1 is bent outwardly, while the other pair of second stoppers 6d2 is bent inwardly. Thus, the axially end surfaces of main poles 2 can be supported by second stoppers 6d1, and the axially end surfaces of iron pieces 7 are supported by second stopper 6d2.

Thus, first stoppers 6c of the third embodiment is omitted, and second stopper 6d2 are made stronger than first stoppers 6c of the third embodiment.

(Fifth Embodiment)

A pole arrangement according to a fifth embodiment of the invention is described with reference to FIG. 9A and FIG. 9B.

A pair of side plates 62 has inwardly extending L-bends 6a. Each L-bend 6a has a pair of resilient arms 6f at the longitudinally opposite ends. Each resilient arms 6f is cut from magnet holder 6 and inclines toward base plate 61 to exert spring force on the inner periphery of auxiliary pole 4 disposed in the U-pipe portion of magnet holder 6. Thus, each auxiliary pole 4 is retained between the pair of resilient arms 6f and third stoppers 6e of base plate 61.

Claw 6g is formed at the edge of each resilient arm 6f so that a pair of claws 6g at the opposite ends supports axially opposite ends of auxiliary pole 4 to restrict axial movement of each main pole 2 relative to each magnet holder 6.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A pole arrangement of a motor including a yoke, a plurality of permanent-magnet main poles disposed annularly at equal intervals on the inner periphery of said yoke, a plurality of magnet holders holding auxiliary poles therein disposed between adjacent two of said main poles, wherein each said magnet holder comprises resilient stopper means having side plates for pressing said main poles in circumferentially outer directions and a base plate connecting said side plates at a radially outer periphery thereof, each said auxiliary pole is held inside said resilient stopper means, and each said magnet holder further comprises a first stopper member supporting said auxiliary pole at axially opposite ends thereof, a second stopper member supporting said main poles at axially opposite ends thereof, an L-bend member at an edge of said side plates and a third stopper member resiliently pressing said auxiliary poles against said L-bend member at said radially outer periphery thereof.

2. The pole arrangement as claimed in claim 1, wherein each said main pole is held only by said resilient stopper means from circumferentially outside.

3. The pole arrangement as claimed in claim 1, wherein said yoke has a pair of projections on an inner periphery thereof, and each said magnet holder has a pair of cavities at axially opposite ends of said radially outer periphery thereof engaged by said projections so that said magnet holders can be fixed to said yoke in both axial and circumferential directions.

4. The pole arrangement as claimed in claim 1, wherein each said auxiliary pole comprises a permanent magnet.

5. The pole arrangement as claimed in claim 1, wherein said auxiliary pole comprises an iron piece.

6. The pole arrangement as claimed in claim 1, wherein each said magnet holder further comprises a holder member disposed separately from said stopper means for holding one of said auxiliary poles therein.

7. The pole arrangement as claimed in claim 1, wherein each said third stopper member comprises a pair of third stoppers extending from said base plate.

8. The pole arrangement as claimed in claim 7, wherein each said third stopper comprises a portion cut out from said base plate.

9. The pole arrangement as claimed in claim 7, wherein each said first stopper member comprises a pair of first stoppers, each said second stopper member comprises a pair of second stoppers, and each said L-bend member comprises a pair of L-bends.

10. A pole arrangement of a motor including a yoke, a plurality of permanent-magnet main poles disposed annularly at equal intervals on the inner periphery of said yoke, a plurality of magnet holders holding auxiliary poles therein disposed between adjacent two of said main poles, wherein each said magnet holder comprises a resilient stopper having side plates that presses said main poles in circumferentially outer directions and a base plate connecting said side plates at a radially outer periphery thereof, each said auxiliary pole is held inside said resilient stopper, and each said magnet holder further comprises a first stopper member supporting said auxiliary pole at axially opposite ends thereof, a second stopper member supporting said main poles at axially opposite ends thereof, an L-bend member at an edge of said side plates and a third stopper member resiliently pressing said auxiliary poles against said L-bend member at said radially outer periphery thereof.

* * * * *